(12) United States Patent
Siemer et al.

(10) Patent No.: US 7,703,753 B2
(45) Date of Patent: Apr. 27, 2010

(54) STOP ELEMENT FOR HYDRAULIC BEARING AND HYDRAULIC BUSHING EQUIPPED THEREWITH

(75) Inventors: Hubert Siemer, Dinklage (DE); Stefan Loheide, Dinklage (DE)

(73) Assignee: ZF Friedrichsafen AG, Friedrichshafen (DE)

( * ) Notice: Subject to any disclaimer, the term of this patent is extended or adjusted under 35 U.S.C. 154(b) by 19 days.

(21) Appl. No.: 12/268,107

(22) Filed: Nov. 10, 2008

(65) Prior Publication Data

US 2009/0140478 A1 Jun. 4, 2009

(30) Foreign Application Priority Data

Nov. 15, 2007 (DE) ........................ 10 2007 054 902

(51) Int. Cl.
*F16F 7/00* (2006.01)
(52) U.S. Cl. ................................. 267/140.12
(58) Field of Classification Search ................................
267/140.12–140.13, 141.1–141.7
See application file for complete search history.

(56) References Cited

U.S. PATENT DOCUMENTS 5,139,241 A * 8/1992 Hamaekers et al. .... 267/140.12

FOREIGN PATENT DOCUMENTS

| DE | 38 18 287 A1 | 12/1989 |
| DE | 3818287 C2 | 12/1989 |
| DE | 196 26 535 A1 | 1/1998 |
| DE | 197 17 210 A1 | 11/1998 |

* cited by examiner

*Primary Examiner*—Christopher P Schwartz
(74) *Attorney, Agent, or Firm*—Norris McLaughlin & Marcus, PA; Christa Hildebrand, Esq.

(57) ABSTRACT

The invention relates to a stop element (1) for a hydraulic bearing and a hydraulic bushing equipped therewith. The proposed hydraulic stop element (1) with a stop body (2, 2') and a stop surface (3) is implemented as a piston-cylinder-assembly with an elastomeric bearing (12) with at least two work chambers for a fluidic damping means. The cylinder (4) of this piston-cylinder-assembly is inserted into the solid material surrounding the outer surface of a metallic element of the elastomeric support (12) which delimits the corresponding work chamber (16, 16') of the elastomeric bearing (12) perpendicular to the main load direction (r). A piston (2, 2') which forms the stop body with a stop surface (3) is movably guided in the cylinder (4) in the main load direction (r) of the elastomeric bearing. A buffer (5) is arranged on the bottom of the cylinder (4), with at least one throttle channel (6) which is connected for flow-conduction with the work chamber (16, 16') of the elastomeric bearing extending through the side wall.

16 Claims, 3 Drawing Sheets

STOP ELEMENT FOR HYDRAULIC BEARING AND HYDRAULIC BUSHING EQUIPPED THEREWITH

BACKGROUND OF THE INVENTION (1) Field of the Invention

The invention is directed to a stop element for a hydraulic bearing, i.e., an elastomeric bearing with hydraulic damping. The invention is also directed to a hydraulic bushing, or an elastomeric bush bearing with hydraulic damping, with at least one radial stop, which can be implemented with the stop element of the invention.

(2) Description of Related Art

Elastomeric bearings of different designs are used in large numbers as axial and radial bearings (bush bearings) to provide oscillation-damping support of structural components of machines, industrial plants, vehicles and buildings. Depending on the application, the bearings formed with an elastomeric bearing body for improving the oscillation characteristic or for increasing the comfort are designed as hydraulic bearings, i.e., provided in addition with hydraulic damping. Elastomeric supports then include at least one work chamber disposed on or in the bearing body for receiving a fluidic damping means, wherein the work chambers are connected with one another for flow communication. If a load is applied in the region of one of the work chambers, then the damping means is displaced into the respective other work chamber, so that mass or throttle damping is provided depending on the geometry of a channel which connects the work chambers for flow conduction.

In particular in the construction of modern vehicles, the bush bearings or radial bearings employed predominantly for the chassis suspension are frequently implemented as hydraulic bushings. The hydraulic bushings generally consist of a preferably metallic, mostly cylindrical inner part, an elastomeric bearing body encompassing the inner part, and an outer sleeve receiving the inner part with the bearing body. At least two work chambers receiving the fluidic damping means are formed inside the bearing body or between the outer contour of the bearing body and the outer sleeve. The work chambers are mutually offset in the circumferential direction and connected by at least one channel.

In practical applications, in particular the chamber walls of such hydraulic bushing are subjected to high loads, because the bearing body absorbs the acting forces and provides damping predominantly by deforming the chamber walls.

To protect the bearing from destruction at high loads due to tearing chamber walls and subsequent leakage of the damping means, the deformation of the chamber walls must be limited. This is attained by forming radial limits stops in or on the bearing or the hydraulic bushing, respectively. The radial limits stops are implemented by forming radial protrusions on the outside of the inner part or on the inside of the outer sleeve, thereby forming a stop body which at high radial loads makes contact with a support surface which faces the stop body in the radial direction. The contact surfaces of both the stop body and the support surface are predominately implemented with the material pair combinations rubber/steel, rubber/aluminum, plastic/steel, plastic/aluminum. A corresponding hydraulic bushing with radial limit stops arranged outside its wall chambers containing the fluidic damping means is described, for example, in DE 38 18 287 C2. Conversely, DE 197 17 210 A1 describes a hydraulic bushing with radial stops arranged in the work chambers of the bushing.

If high radial loads act on the elastomeric bush bearing and the oscillations causing the loads also have a high frequency, which happens with shock-like loads, then the bearing body, in particular the chamber walls, encounter high deformation speeds. The radial stops are mainly employed to absorb high radial loads which simultaneously cause torsional and gimbal excursions of the hydraulic bearing. High surface pressures are accompanied by relative movements between the loaded contact surfaces constructed of the aforementioned materials. If the radial stops are provided with a rubberized surface, then the aforedescribed relative movements causes high abrasion at large excursions, because of the rigid connection between the limit stops and the respective base body. On the other hand, small excursions may produce noticeable and annoying noise. Moreover, when the corresponding bearing components strike the stop body, the force transmission of the bearings disclosed in the aforementioned documents becomes abruptly progressive.

However, it is desirable for improving the comfort to dampen the limit stop so that the surface areas of the bearing elements, which come into contact with the stop bodies, do not stop abruptly, but gradually depending on the deformation speed. Accordingly, instantaneous damping of the actual forces and a slow progression of the counterforces produced by these forces in the bearing is desired. For this reason, elastomeric bearings, in particular hydraulic bushings, have been disclosed where in the limit stop(s) is/are also hydraulically damped. A hydraulic bushing of this type is described in DE 196 26 535 A1. In the bush bearing described in this document, the otherwise cylindrical inner part has a rubberized outer surface and in the region of the work chambers a corresponding bulge. A V-shaped depression is machined in each of the bulges. A stop body formed as a truncated cone is inserted into the depression, which floats on a fluid film which is formed by the damping means from the work chamber and disposed between its outer surfaces and the outer surfaces of the depression. Accordingly, a small channel for the damping means is formed between the stop body operating at a displacement body and the outer surfaces of the depression. This initially provides basically a good impact damping. However, the relatively large rubber surfaces on the legs of the V-shaped depression have proven to be a disadvantage. It has been observed that the rubber of the bearing body covering the depression is subjected to heavy wear. In addition, the narrowness of the channel below the stop body allows the desired damping characteristics to be adjusted only within certain limits.

BRIEF SUMMARY OF THE INVENTION

It is an object of the invention to construct a stop element for hydraulic bearings which can provide damped axial and/or radial limits stops for limiting the spring travel of the elastomeric bearing body, wherein the stop characteristics of the stop element can be adapted to the increasing deformation speed at large bearing loads and varied over a wide range. The stop element should also have an improved durability. This object should be attained by minimizing the load applied to those components of hydraulic bushings with corresponding limit stops that are critical for long-term durability, and by reducing the relative movement between the contact surfaces of the limits stops under load. It is also an object to provide a hydraulic bushing with a radial stop having an improved long-term durability.

The object is attained with a stop element having the features of the independent claim. A bush bearing with hydraulic damping for attaining the object is characterized by the first claim directed to such bush bearing. Advantageous embodiments and modifications of the invention are recited in the corresponding dependent claims.

The stop element proposed for attaining the object, which includes a stop body, is arranged in an elastomeric bearing with an elastomeric bearing body in a work chamber configured to receive a fluidic damping means and forms a limit stop which limits deformation of the bearing body in a main load direction. The deformation excursion is limited in that a surface area of an element of the elastomeric bearing facing the stop body strikes the stop body. The impact of the respective surface area on the stop body is hydraulically damped due to the special design of the stop element. According to the invention, the stop element is here formed as a piston-cylinder assembly. The cylinder of this arrangement is formed by a metallic sleeve and inserted in the solid material, which surrounds the outer surface of the cylinder, of a metallic element of the elastomeric bearing, which delimits the work chamber of the elastomeric bearing perpendicular to the main load direction and has a corresponding opening. An elastomeric buffer disposed at the bottom of the cylinder of the piston-cylinder-assembly forming the stop element. Moreover, at least one throttle channel extends through the side wall of the cylinder and is connected for flow conduction with the work chamber of the elastomeric bearing. The piston of the assembly of the invention for realizing the stop element form the stop body with a corresponding stop surface. The stop body or the piston is movable inside the cylinder in the main load direction. The piston is made of metal at least at its contact surfaces facing the cylinder. The piston-cylinder-assembly is constructed such that in the unloaded state of the stop element, a cylinder chamber is formed between the bottom of the cylinder and the piston, which is filled with the fluidic damping means of the work chamber of the elastomeric bearing. The respective cylinder chamber fills up with the fluidic damping means from the work chamber surrounding the stop element via the aforementioned throttle channel disposed in the wall of the cylinder. The assembly is further constructed such that the stop body moves, when the stop element is loaded, towards the cylinder bottom, thereby displacing damping means from the diminishing cylinder chamber via the at least one throttle channel into the work chamber of the elastomeric bearing.

The invention is based on the premise that the long-term durability of a stop element provided for elastomeric bearings with hydraulic damping can be improved by drastically reducing the fraction of elastomeric regions. In the stop element of the invention, only the buffer arranged at the bottom of the cylinder is therefore made of an elastomeric material. Preferably, the buffer is made of a different, optionally stiffer elastomer than the bearing body of the elastomeric bearing receiving the stop element, whereas all other regions of the stop element are made from dimensionally stable and extremely wear-resistant materials. The cylinder itself is preferably made of steel and has a hardened outer surface. The stop element will therefore be dimensionally stable even under extremely high loads, such as the loads applied to the elastomeric bearings in vehicles, while eliminating problems encountered with conventional bearings. Elastomeric bearings with the stop element of the invention can therefore be expected to have improved durability.

The cylinder of the stop element can be attached in the opening provided in a corresponding element of the elastomeric bearing in several ways. Preferably, the stop element may be inserted in the opening with a press fit, which advantageously simplifies the technical processes and hence also the fabrication. However, the stop element may also be attached with screws or with a positive fit. According to a preferred embodiment, the stop elements of the invention can be highly loaded by implementing the cylinder as a closed cup. The bottom of the cylinder is here formed by a sleeve which is closed off on that side. The elastomeric buffer is arranged on this bottom inside the sleeve.

The piston, which preferably is also formed substantially of metal, has a slightly smaller diameter than the cylinder, with the difference in diameter preferably selected so that the piston is floatingly supported in the cylinder. A thin fluid film is formed by the fluidic damping means between the outer wall of the piston and the inner wall of the cylinder, which reduces friction and wear when the surfaces of the piston and cylinder move relative to each other. Preferably, a groove is machined in the outer circumference of the piston, in which an O-ring is inserted, to prevent larger quantities of the damping means from leaking out under load laterally between the cylinder and the piston. According to an advantageous embodiment, a groove is also formed in the inner wall of the cylinder in the region of the open end of the cylinder, with the O-ring of the piston moving into the groove when the stop body springs back, thereby preventing the stop body from moving out of the cylinder or providing another possibility for adjusting the stroke of the piston which also determines the damping characteristics. According to a preferred embodiment of the invention, the stop body of the stop element, i.e. the piston, is implemented as a metallic body, in which for forming the stop surface, a plastic insert is inserted on a side protruding into the work chamber of an elastomeric bearing provided with a stop element. By forming the stop surface of a plastic material, less noise is produced wherein the surface element opposite the stop body strikes the stop body. The metal body receiving the plastic insert can also be made of steel and have a hardened outer surface.

The damping characteristic of the stop element according to the invention is determined to a large extent by the length and the diameter of the at least one throttle channel formed in the wall of the cylinder. The damping characteristic can then also be influenced by forming several throttle channels extending through the cylinder wall. Moreover, the arrangement of the throttle channel(s) determines also the stroke of the piston, which also affects the damping characteristic. If the stop body is moved with the stop element under load by more than this stroke towards the cylinder bottom, then the respective throttle channel is closed by the stop body, so that the stop element transitions into progression and the stop goes to the end position of the stop defined by the elastomeric buffer disposed at the bottom of the cylinder. The transition and the begin of the progression can advantageously be controlled by arranging several throttle channels sequentially relative to the travel direction of the piston. The progressive course of the stop characteristic is then determined by the throttle channels which are successively closed by the outer wall of the moving piston.

To simplify the fabrication, the elastomeric buffer is vulcanized onto a metal plate outside the respective bearing, and this metal plate with the rubber buffer is pushed into the cylinder which has already been placed in the bearing when the bearing is fabricated, and affixed at its bottom. This facilitates shaping the elastomeric buffer, because it would be technically complex to form the buffer inside the cylinder and to prevent the elastomer from flowing into the throttle channel(s) of the cylinder during the shaping process. The metal plate and the buffer connected thereto by vulcanization can be attached to the bottom of the cylinder, for example, by using an adhesive or by a press fit.

The bush bearing proposed for attaining to object of the invention is a bush bearing with hydraulic damping and with one or several radial stops. This bush bearing consists in a conventional manner of a metallic inner part, an elastic bearing body encompassing the inner part and an outer sleeve receiving the inner part and the elastomeric bearing body. In addition, at least two work chambers for receiving a fluidic damping means are formed in or on the bearing body. These work chambers are arranged with an offset relative to the circumferential direction of the bearing and connected with one another by at least one channel. According to the invention, this otherwise conventional bearing has at least one radial stop, which is formed as a hydraulic stop using the aforedescribed stop element according to the invention. The cylinder of the respective stop element is inserted in a bulge formed in a region of the at least one work chamber on the otherwise cylindrical inner part, wherein a recess is provided in this bulge, in which the cylinder of the stop element is affixed. The stop element constructed according to the invention therefore rises from the inner part of the bush bearing and projects with the stop body into the corresponding work chamber in the radial main load direction of the bearing. According to the invention, a through opening is formed in the bulge formed on the inner part for receiving the stop element, which connects the throttle channel of the stop element with the work chamber. The cylinder of the stop element is inserted into the aforementioned recess in the region of the bulge of the inner part, preferably by a press fit.

In a practical embodiment, the inner part of the bearing is made of aluminum, with two mutually offset work chambers arranged on the circumference between the elastomeric bearing body and the outer sleeve. Moreover, a corresponding radial stop, which is formed as a stop element according to the invention with a throttle channel, is formed in each of the work chambers. The inner part therefore has a corresponding bulge in the region of both work chambers. A bore extending perpendicular to both the bearing axis and the radial main load direction is formed in each of the bulges for flow conduction of the throttle channel of the corresponding stop element.

Details of the invention will now be described with reference to an exemplary embodiment. The appended drawings show in:

DETAILED DESCRIPTION OF THE INVENTION

Figure 1:
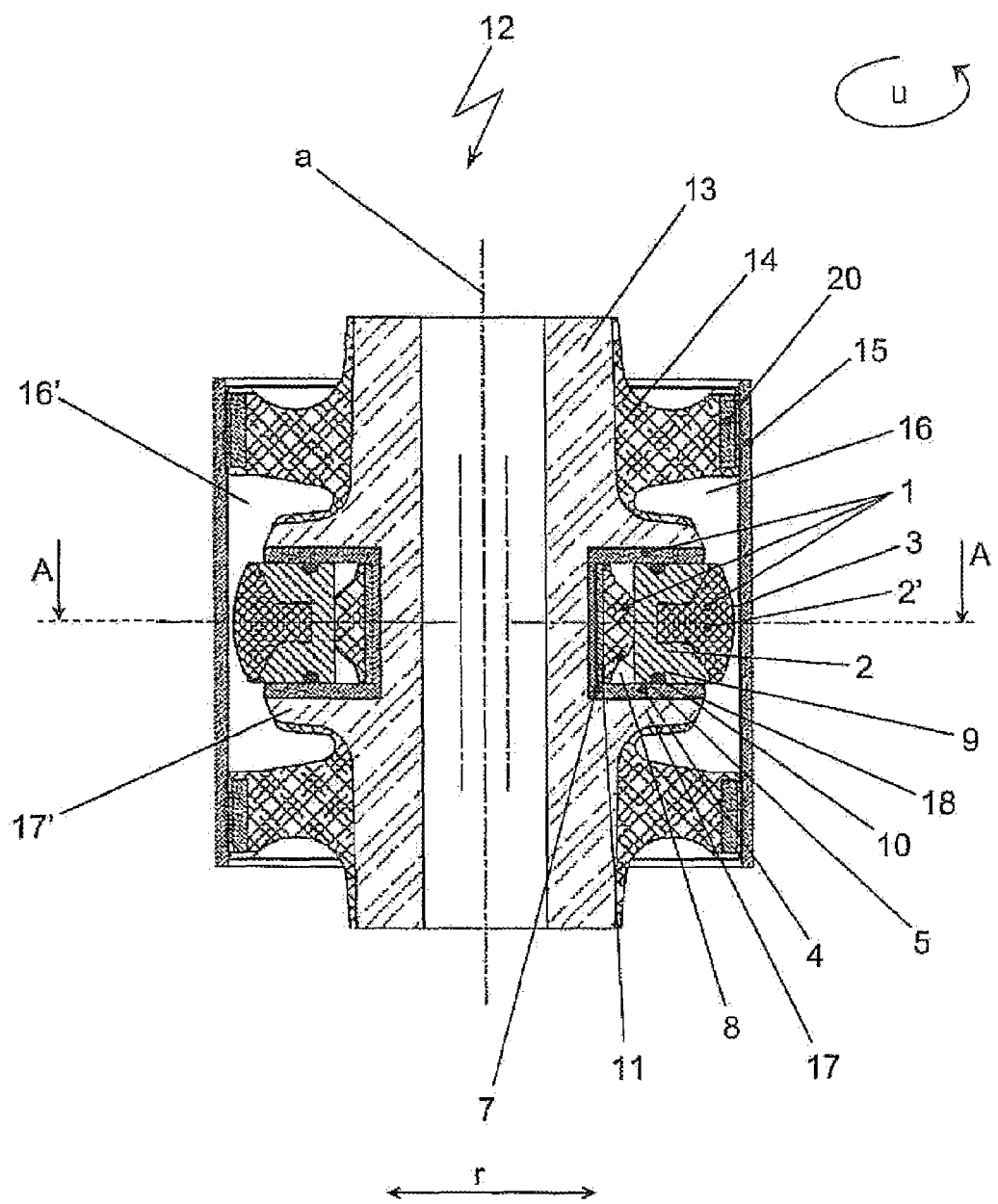
FIG. 1 an embodiment of the bush bearing provided with the stop element according to the invention in an axial cross-section.

FIG. 1 shows an embodiment of the elastomeric bush bearing 12 according to the invention in an axial cross-sectional view through the elastomeric bearing 12. The bush bearing 12 is implemented as hydraulic bearing and includes a stop element 1 according to an embodiment of the invention. It consists of, in a manner known in the art, an essentially cylindrical metallic inner part 13, the elastomeric bearing body 14 encompassing the inner part 13 and connected thereto by vulcanization, and the outer sleeve 15 receiving the inner part 13 with the bearing body 14. Two work chambers 16, 16' are formed in the bearing body 14 between its outer contour and the outer sleeve 15 for receiving a fluidic damping means. The work chambers 16, 16' are connected with each other by a channel, which is not illustrated in FIG. 1.

The inner part 13 consisting of aluminum has, as indicated in the drawing, a corresponding bulge 17, 17' in a center region, namely in the region of the working chambers 16, 16'. A recess 18 is formed in each of the bulges 17, 17', in which the stop element 1 of the invention is inserted with a press fit. If a strong radial force acts on the elastomeric bush bearing 12, the surface area of the inner surface of the outer sleeve 15 strikes this stop element 1, thereby limiting the deformation of the corresponding work chamber, or of its chamber walls.

The stop element 1 consists of the exemplary cup-shaped cylinder 4, the piston 2, 2' movably arranged therein, and the elastomeric buffer arranged on the cylinder bottom 7. The sidewalls of the cylinders 4 of the two stop elements 1 are penetrated by a throttle channel 6 shown in FIGS. 2 and 3. The piston 2, 2' of the respective stop element 1, or of its stop body, is formed in two parts, wherein a plastic element 2' forming a stop surface 3 is pressed into a metallic body 2 of the stop body 2, 2' which slides with its outer sides along the inner walls of the cylinder. A cylinder chamber 11, which is filled with the fluidic damping means from the respective work chamber 16, 16', is formed in the cylinder 4 between the stop body 2, 2' and the bottom of the respective cylinder 4 with the buffer 5. The damping means enters the cylinder chamber 11 through the throttle channel 6 disposed in the cylinder 4 and its flow-conducting connection 19 with the work chamber 16, 16' (see FIGS. 2 and 3).

The piston 2, 2', or the stop body, is floatingly supported in the cylinder 4. A fluid film is formed by the fluid damping means between the outer wall of the stop body 2, 2' and the inner wall of the respective cylinder 4. An O-ring 10 is inserted in a groove 9 formed in the piston 2, 2' to prevent large quantities of the damping means from leaking out laterally between the cylinder wall and the outer piston wall when the stop element 1 is under load. In the illustrated elastomeric bush bearing 12, the regions of the elastomeric bearing 14 located above and below the work chambers 16, 16' are reinforced with an insert 20 made of plastic or metal.

Figure 2:
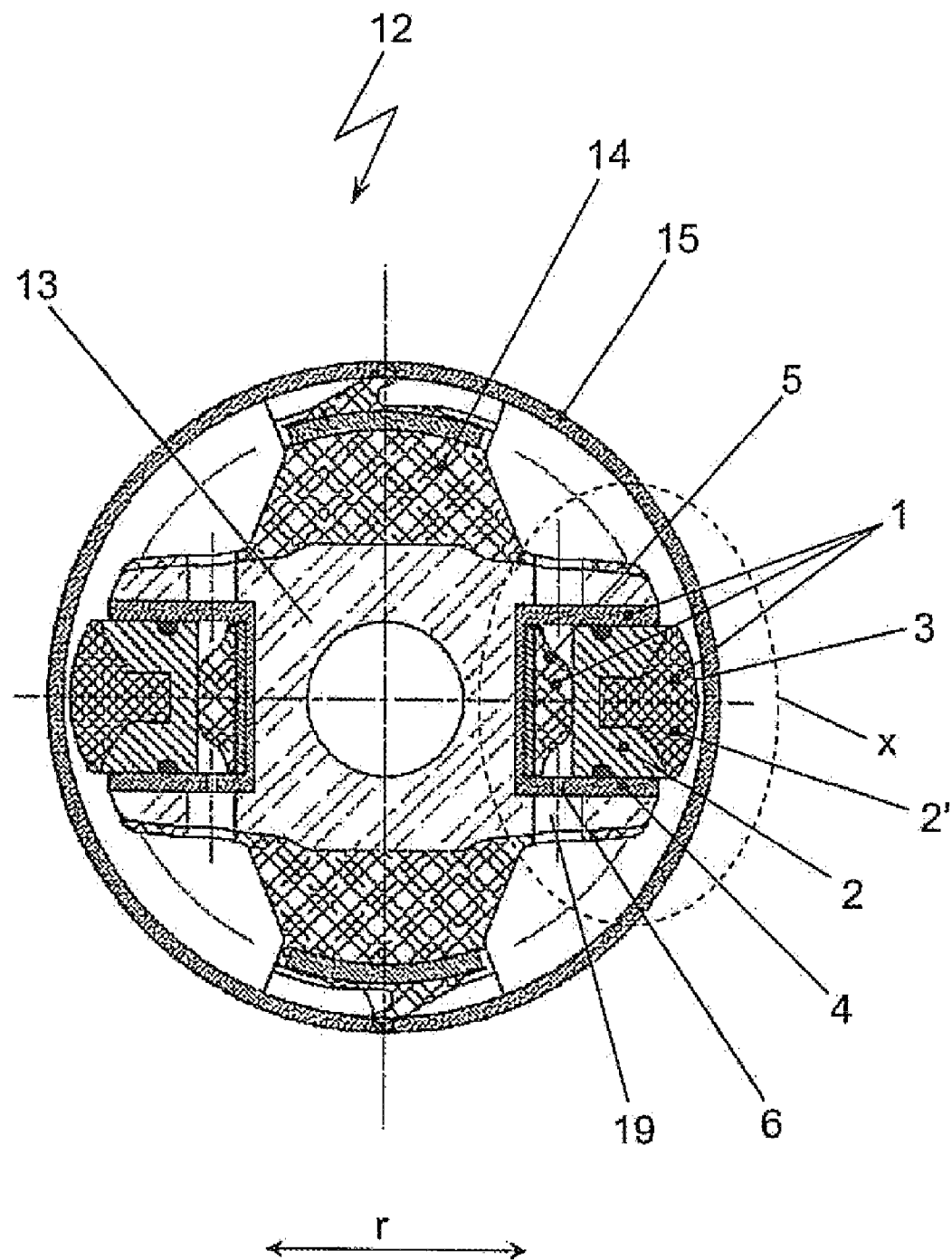
FIG. 2 the bush bearing of FIG. 1 in a radial cross-section taken along the line A-A.

FIG. 2 shows once more the elastomeric bush bearing 12 according to FIG. 1 in a radial cross-section. The cross-section is here taken at the center of the work chambers 16, 16' along the line A-A. Also shown are the throttle channel 6 extending through the side wall of the cylinder 4 of the two similarly constructed stop elements 1 and its flow-conducting connection 19 with the respective work chamber 16, 16'.

Figure 3:
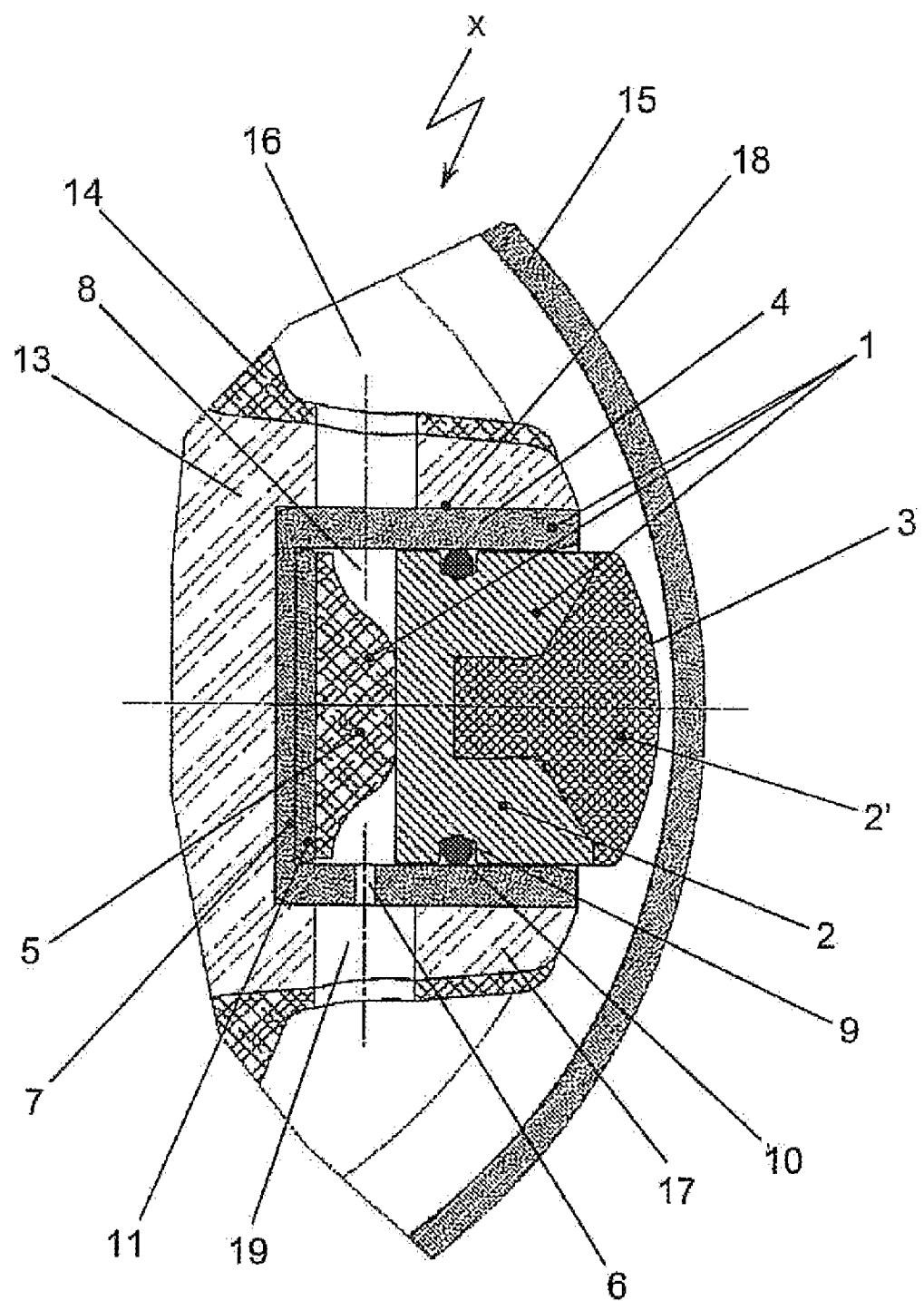
FIG. 3 the detail X in an enlarged view compared to FIG. 2.

This is illustrated more clearly in FIG. 3 which shows the detail X of FIG. 2. The stop element 1 is also shown in FIG. 3. It would also be feasible to construct the cylinder 4 as a sleeve that is open on both ends and pressed into the bulge 17 of the inner part 13, wherein the bottom 7 of the cylinder would in this case be formed by the material of the inner part 13. It would theoretically be possible that due to high loads applied to the stop element 1 and the related movement of the piston 2, 2', parts of the fluidic damping means could be pressed underneath the edge of such sleeve received by the recess 18, which may push the sleeve out of the recess 18. The stop element 1 may withstand an even higher load due to the exemplary cup-shaped construction of the cylinder 4, which eliminates this problem.

As already mentioned, the stop body 2, 2' moves under a radial load of the stop element 1 towards the cylinder bottom 7, whereby the cylinder chamber becomes smaller and damping means contained therein move through the throttle channel 6 into the work chamber 16, 16' which surrounds the bulge 17 of the inner part. A bore 19, which extends perpendicular to the bearing axis a and the radial main load direction r, is formed to provide a flow-conducting connection between the throttle channel 6 and the work chamber 16, 16'. When the stop body 2, 2' has moved far enough in the direction of the bottom 7 of the cylinder 4 so that its outer wall closes off the throttle channel 6, the limits stop goes strongly into progression, with the incompressible rubber of the buffer 5 forming an absolute final stop. When the stop element 1 is unloaded, the piston 2, 2', or stop body 2, 2', respectively, moves out off the cylinder 4 due to the spring-back of the buffer 5. The throttle channel 6 is then again open and the damping means flows from the work chamber 16, 16' of the hydraulic bushing 12 into the cylinder chamber 11. The stop body 2, 2' is prevented from completely sliding out of the cylinder 4 due to the small gap between the stop surface 3 of the stop body 2, 2' and the outer sleeve 15 of the bush bearing 12. Optionally, an additional groove (not illustrated in the example) can be arranged on the cylinder 4 or on the inner surface of the sleeve forming the cylinder in the region of the open end of the sleeve, allowing the O-ring to move into the additional groove when the stop body 2, 2' springs back, thus preventing the stop body 2, 2' from moving farther out of the cylinder 4. In addition, the piston stroke can also be adjusted. Damping of the stop element 1 is determined not only by the stroke of the piston 2, 2', but importantly also by the diameter of the throttle channel 6, its length and position (distance to the buffer 5), and can therefore the flexibly adjusted.

The stop element 1 of the invention, described above in the context with its use for implementing a radial stop in a hydraulic bushing 12 according to the invention, can also be employed in the automotive industry for realizing axial stops in axial bearings, for example in engine supports. The cylinder 4 is then inserted, for example, into the solid material of a channel plate which extends radially in this type of hydraulic bearing or in one of the steel parts for connecting the dome-shaped elastomeric support body with, for example, a supported machine part.

LIST OF REFERENCE SYMBOLS 1 stop element
2, 2' piston=stop body
 with 2 metal body
 2' plastic insert
3 stop surface
4 cylinder
5 buffer
6 throttle channel
7 (cylinder) bottom
8 cylinder chamber
9 groove
10 O-ring
11 metal plate
12 elastomeric bearing
13 inner part
14 bearing body
15 outer sleeve
16, 16' work chamber
17, 17' bulge
18 recess
19 flow-conducting connection, bore
20 insert
a bearing axis
r main load direction
u circumferential direction

The invention claimed is:

1. A stop element (1) comprising
a stop body (2, 2'), the stop element (1) being arranged in an elastomeric bearing (12) with an elastomeric bearing body (14) in a work chamber (16, 16') configured to receive a fluidic damping means and forming a limit stop, the limit stop limiting deformation of the bearing body (14) in a main load direction (r) by impacting on a surface area of an element of the elastomeric bearing (12) facing the stop body (2, 2'), wherein the impact of the respective surface area on the stop body (2, 2') is hydraulically damped by the stop element (1), wherein the stop element (1) is configured as a piston-cylinder-assembly, comprising
a cylinder (4) formed by a metallic sleeve, with the cylinder (4) being inserted in the solid material, which surrounds the outer surface of the cylinder (4), of a metallic element of the elastomeric bearing (12), which delimits the work chamber (16, 16') of the elastomeric bearing (12) perpendicular to the main load direction (r) and is provided with a corresponding opening (18),
an elastomeric buffer (5) disposed at the bottom of the cylinder (4),
at least one throttle channel (6) extending through the side wall of the cylinder (4) and connected for flow conduction with the work chamber (16, 16') of the elastomeric bearing,
a piston (2, 2') which forms the stop body with a stop surface (3) and is movable inside the cylinder (4) in the main load direction (r) and is made of metal at least at its contact surfaces facing the cylinder (4),
wherein in the unloaded state of the stop element (1), a cylinder chamber (8) is formed between the bottom (7) of the cylinder (4) and the piston (2, 2'), which is filled with the fluidic damping means of the work chamber (16, 16') of the elastomeric bearing (12),
the piston (2, 2') forming the stop body moves, when the stop element (1) is loaded, towards the cylinder bottom (7), thereby displacing damping means from the diminishing cylinder chamber (8) via the at least one throttle channel (6) into the work chamber of the elastomeric bearing.

2. The stop element (1) according to claim 1, wherein the stop element (1) is secured in the opening (18) for force transmission.

3. The stop element (1) according to claim 2, wherein the stop element (1) is inserted in the opening (18) with a press fit.

4. The stop element (1) according to claim 1, wherein the cylinder (4) is formed as a closed cup with a sleeve that is closed on the side facing the stop body (2, 2'), wherein the elastomeric buffer (5) is arranged at the bottom (7) of the cup-shaped cylinder (4).

5. The stop element (1) according to claim 4, wherein the cylinder (4) is made of steel and has a hardened outer surface.

6. The stop element (1) according to claim 1, wherein the piston (2, 2') is floatingly supported in the cylinder (4) and a fluid film is formed by the fluidic damping means between the contact surfaces of the piston (2, 2') and the cylinder (4).

7. The stop element (1) according to claim 6, wherein a groove (9) is machined in the outer surface of the piston (2, 2'), in which groove an O-ring (10) is inserted.

8. The stop element (1) according to claim 7, wherein a groove is machined in the inner wall of the cylinder (4) in the region of the open end of the cylinder (4), with the O-ring (10) of the piston (2, 2') moving into the groove when the stop element (1) is unloaded and the piston (2, 2') springs back, thereby limiting the travel of the piston (2, 2') out of the cylinder (4).

9. The stop element (1) according to claim 1, wherein the outer wall of the cylinder (4) is penetrated by several throttle channels (6) which are arranged sequentially in relation to the main load direction (r).

10. The stop element (1) according to claim 1, wherein the elastomeric buffer (5) arranged at the bottom (7) of the cylinder (4) is made of a different, stiffer elastomer than the bearing body (14) of the elastomeric bearing (12).

11. The stop element (1) according to claim 1, wherein the elastomeric buffer (5) is vulcanized onto a metal plate (11) and inserted in the cylinder (4) together with the metal plate (11) and secured to the bottom (7) of the cylinder (4).

12. The stop element (1) according to claim 1, wherein the stop body (2, 2') is formed as a metallic body (2) with a plastic insert (2') which is inserted into the metallic body (2) for forming the stop surface (3).

13. The stop element (1) according to claim 1, wherein the stop element (1) is secured in the opening (18) with a positive fit.

14. An elastomeric bush bearing (12) with hydraulic damping and one or several radial stops, comprising
a metallic inner part (13),
an elastomeric bearing body (14) encompassing the inner part (13), and
an outer sleeve (15) receiving the inner part (13) and the elastomeric bearing body (14), at least two work chambers (16, 16') arranged in or on the bearing body (14) and mutually offset in relation to the circumferential direction (u) of the bush bearing (12) for receiving a fluidic damping means, and at least one channel connecting the work chambers (16, 16'), wherein a bulge (17) is formed on the otherwise cylindrical inner part (13) in the region of at least one work chamber (16, 16'),
wherein at least one radial stop is formed by a stop element (1) and arranged in a work chamber (16, 16'), wherein the radially extending cylinder (4) of the stop element (1) is affixed in a recess (18) disposed in the bulge (17) and the piston (2, 2') of the stop element (1) forming the stop body protrudes into the corresponding work chamber (16, 16') in the radial main load direction (r) of the bush bearing (12), and
wherein a through opening, which connects the throttle channel (6) of the stop element (1) with the corresponding work chamber (16, 16'), is formed in the bulge (17).

15. The elastomeric bush bearing (12) according to claim 14, wherein the cylinder (4) of the stop element (1) is inserted in the opening (18) with a press fit.

16. The elastomeric bush bearing (12) according to claim 14 with an inner part (13) made of aluminum,
wherein in each of the work chambers (16, 16') a corresponding radial stop formed by a stop element (1) having a throttle channel (6) is arranged,
wherein the inner part (13) has in the region of each of the two work chambers (16, 16') a corresponding bulge (17, 17'), and
wherein in each of the two bulges (17, 17') a bore (19) is formed which is orthogonal to the bearing axis (a) and also to the radial main load direction (r).

* * * * *